(12) United States Patent
Guo

(10) Patent No.: US 7,079,868 B2
(45) Date of Patent: *Jul. 18, 2006

(54) SMART ANTENNA ARRAYS

(75) Inventor: Yingjie Jay Guo, Aylesbury (GB)

(73) Assignee: Mobisphere Limited, Bracknell (GB)

( * ) Notice: Subject to any disclaimer, the term of this patent is extended or adjusted under 35 U.S.C. 154(b) by 671 days.

This patent is subject to a terminal disclaimer.

(21) Appl. No.: 10/152,800

(22) Filed: May 23, 2002

(65) Prior Publication Data
US 2002/0187813 A1 Dec. 12, 2002

(30) Foreign Application Priority Data
Jun. 12, 2001 (GB) .............................. 0114267

(51) Int. Cl.
H04B 1/38 (2006.01)
H04B 7/00 (2006.01)

(52) U.S. Cl. ................. 455/562; 455/63.4; 455/69; 455/562.1; 370/335

(58) Field of Classification Search ........... 455/63.4, 455/69, 507, 517, 562.1, 25, 13.3, 65; 370/335, 370/342; 342/370, 359, 360, 361, 367, 368
See application file for complete search history.

(56) References Cited

U.S. PATENT DOCUMENTS

| | | | | |
|---|---|---|---|---|
| 5,634,199 A | | 5/1997 | Gerlach et al. ............... 455/63 |
| 6,084,928 A | * | 7/2000 | Kuwahara .................. 375/347 |
| 6,091,788 A | * | 7/2000 | Keskitalo et al. ........... 375/347 |
| 6,317,098 B1 | * | 11/2001 | Andrews et al. ............ 343/797 |
| 6,351,238 B1 | * | 2/2002 | Kishigami et al. .......... 342/445 |
| 6,397,083 B1 | * | 5/2002 | Martin et al. ............. 455/562.1 |
| 6,453,177 B1 | * | 9/2002 | Wong et al. .............. 455/562.1 |
| 6,473,055 B1 | * | 10/2002 | Kohno et al. ............... 343/853 |
| 6,597,678 B1 | * | 7/2003 | Kuwahara et al. .......... 370/342 |
| 6,606,058 B1 | * | 8/2003 | Bonek et al. ................ 342/383 |
| 6,611,675 B1 | * | 8/2003 | Salonen et al. ............... 455/69 |
| 6,697,640 B1 | * | 2/2004 | Katz et al. .................. 455/561 |
| 6,763,011 B1 | * | 7/2004 | Hakkinen et al. ........... 370/337 |
| 6,766,144 B1 | * | 7/2004 | Kim et al. ................ 455/67.11 |
| 2004/0095907 A1 | * | 5/2004 | Agee et al. ................. 370/334 |

FOREIGN PATENT DOCUMENTS

| | | |
|---|---|---|
| EP | 1079543 | 2/2001 |
| EP | 1267443 | 12/2002 |
| WO | WO 98/42150 | 9/1998 |
| WO | WO 99/57820 | 11/1999 |
| WO | WO 01/35548 | 5/2001 |

* cited by examiner

Primary Examiner—Simon Nguyen
(74) Attorney, Agent, or Firm—Crowell & Moring LLP

(57) ABSTRACT

The present invention relates to a beamforming method for smart antenna arrays. Smart antennas employ arrays of low gain antennas connected to a combining/beamforming network. Smart antennas can provide enhanced coverage through range extension, hole filling and improved building penetration. By improving transmission and reception at the base station, the tolerable path losses can be increased whereby the range of the base station can be improved. A first aspect of the invention addresses the feedback signalling technique presently being considered by standards bodies for four antennas in large arrays. The invention is suitable for CDMA wireless cellular systems, as presently determined for third generation cellular wireless networks, and other wireless systems such as TDMA systems and wireless LANs.

16 Claims, 9 Drawing Sheets

SMART ANTENNA ARRAYS

FIELD OF THE INVENTION

This invention relates to a beamforming method for smart antenna arrays.

BACKGROUND TO THE INVENTION

Smart antenna arrays, otherwise known as adaptive antenna arrays, comprise of low gain antennas connected to a combining/beamforming network. Smart antennas can provide enhanced coverage through range extension, hole filling and improved building penetration. By improving transmission and reception at the base station, the tolerable path losses can be increased whereby the range of the base station can be improved. By using smart antennas at the base station, initial deployment costs of a wireless network can be reduced: with the development in system usage, system capacity can be increased by adding additional cell sites and decreasing the range of existing base stations.

Digital beamforming, whereby smart antenna arrays are conveniently implemented, is considered as one of the most promising techniques for UMTS networks. Linear and planar antenna arrays are normally considered as candidate antenna types, since they produce low sidelobe levels with respect to other types of antenna such as the circular array. If a communications antenna array produces high sidelobes in the beampattern, it will cause strong interfering signals to mobile terminals in some directions, which can be a severe problem for downlink transmission.

In the R'99 UTRAN specification, a feedback mechanism was introduced to assist the transmit diversity technique employing two antennas. The concept is to transmit downlink signals of constant power from two different antennas using different scrambling codes to all the mobiles in the common channels and then to adapt the antenna weights for dedicated channels according to the feedback received from the intended mobile. Currently, there is great commercial interest in proposals to introduce feedback signalling to four antennas. Such feedback information enables adaptive beamforming for arrays with four elements. On the one hand, owing to the limited bandwidth for signalling, it is unlikely that any signalling mechanism for more than four antennas will be ever introduced. On the other hand, certain arrays such as circular arrays for cellular networks need at least eight antennas to achieve significant array gain. Also, it is conceivable that linear antenna arrays consisting of more than four elements will be used in future UTRAN products.

OBJECT OF THE INVENTION

The present invention seeks to provide an improved antenna arrangement suitable for use in a cellular base station. The present invention further seeks to provide an antenna arrangement operable to increase the capacity of a cellular communications base station. The present invention also seeks to provide a beamforming technique which enables the exploitation of the current feedback signalling scheme in large arrays, for antennas which are either directional or omni-directional.

STATEMENT OF THE INVENTION

In accordance with a first aspect of the invention, there is provided a smart antenna basestation arrangement comprising an array of antenna elements, subdivided into a number of sub-arrays wherein:

an element or selected elements from each sub-array is operable to broadcast common control channel signals, which are, in operation, returned by mobile terminals in the area of coverage of the basestation;

the arrangement being operable to apply stored weight data and direction of arrival data together with feedback data to enable the array to generate directional downlink beams in the direction of said mobile.

The feedback signal can assist in the optimisation of phase and amplitude components for the beamforming weights to be assigned for dedicated channels.

The feedback signal can assist in the optimisation of a phase component for the beamforming weights to be assigned for dedicated channels.

The feedback signal can assist in the optimisation of an amplitude component for the beamforming weights to be assigned for dedicated channels.

The phase information of the feedback signal can be used to determine a phase component of the pilot antenna weights.

The magnitude of the feedback signal can be used to determine a magnitude component of the pilot antenna weights.

The array can comprise directional antennas or an array of omni-directional antennas.

In accordance with a second aspect of the invention, there is provided a method of operating a smart antenna basestation arrangement comprising an array of antenna elements, subdivided into a number of sub-arrays, the method comprising the steps of:

transmitting from an element or selected elements of each sub-array pilot signals, receiving feedback signals returned by mobile terminals in the area of coverage of the basestation;

the arrangement being operable to apply stored weight data and direction of arrival data together with feedback data to enable the array to generate directional downlink beams in the direction of said mobile.

A first aspect of the invention thus addresses the feedback signalling technique presently being considered by 3GPP for four antennas, either directional or omni-directional in large arrays. The invention is suitable for CDMA wireless cellular systems, as presently determined for third generation cellular wireless networks, and other wireless systems such as TDMA systems and wireless LANs. The present invention therefore can assist in the realisation of further advantages in smart antennas.

BRIEF DESCRIPTION OF THE FIGURES

The invention may be understood more readily, and various other aspects and features of the invention may become apparent from consideration of the following description and the figures as shown in the accompanying drawing sheets, wherein.

DETAILED DESCRIPTION OF THE INVENTION

There will now be described, by way of example, the best mode contemplated by the inventors for carrying out the invention. In the following description, numerous specific details are set out in order to provide a complete understanding of the present invention. It will be apparent, however, to those skilled in the art, that the present invention may be put into practise with variations of this specific. For example, the specific description relates to antennas which are omni-directional, but it will be apparent that directional antennas could be used instead.

Figure 1:
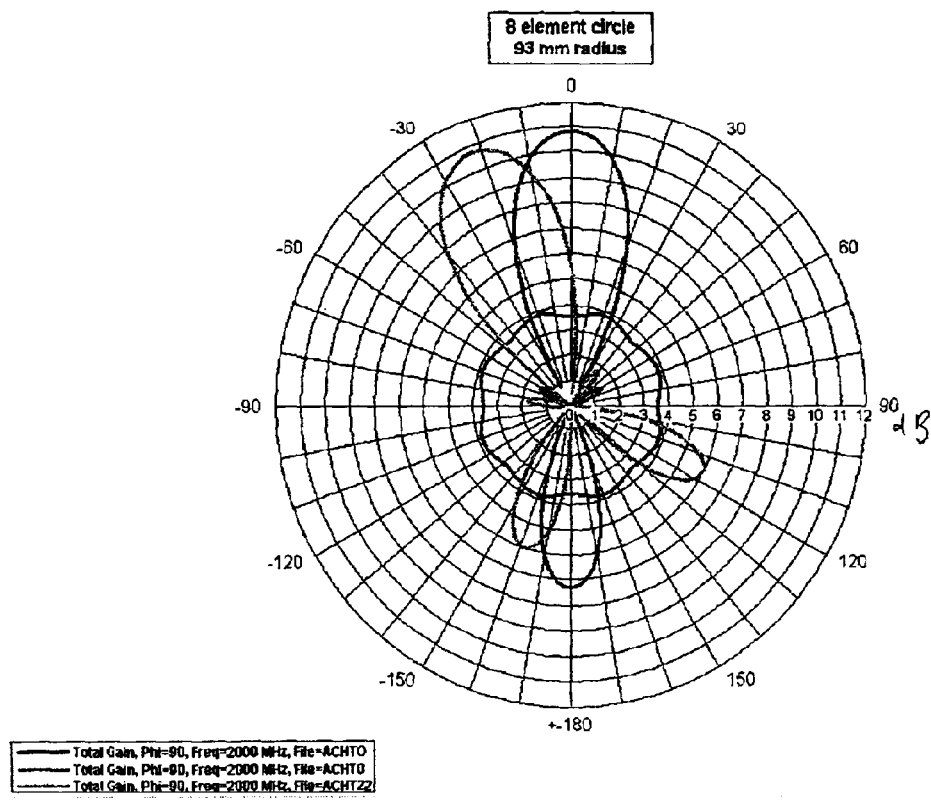
FIG. 1 shows beampattern examples of a circular array.

Hitherto, the use of circular arrays has been limited since most beamforming algorithms tend to generate high sidelobes when used for circular arrays, thus causing strong interference to other mobiles and limiting the use of spatial domain multiple access (SDMA). The use of other types of 2-dimensional arrays, not being circular, certainly has not been publicised, but would also suffer from similar problems. Referring to FIG. 1, there is shown some beampatterns of Siemens' TD-SCDMA circular antenna array. It can be seen that the sidelobe level (of the directional beams) can be as high as −4 dB, whereas it is not difficult to achieve −12 dB sidelobe level for a linear array. The problem is especially severe for W-CDMA networks as code shortage in the downlink effectively limits the data rate. A reference pattern, substantially uniform in all directions is shown, provided by a single omni-directional antenna.

The beampattern of an antenna array is determined to a large extent by the beamforming weights. For linear arrays, there are a number of well-known weight distribution functions which produce low sidelobes, such as Taylor and Chebyshev distributions. For non-linear arrays, unfortunately, there is no easy solution. In theory, given the constraint conditions and objective function, the weights of an array can be optimised in real time by the use of optimisation methods. In practice, however, such a technique is difficult to implement due to the excessive demand on the signal processing power.

Figure 2:
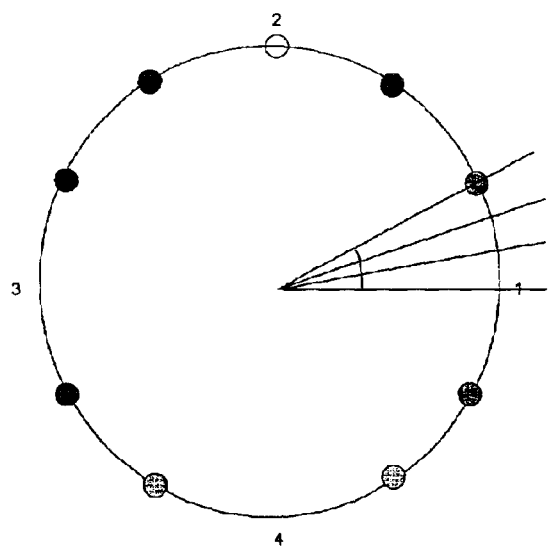
FIG. 2 shows a 2-dimensional arrangement of omni-directional antennas arranged in a circle.
Figure 3:
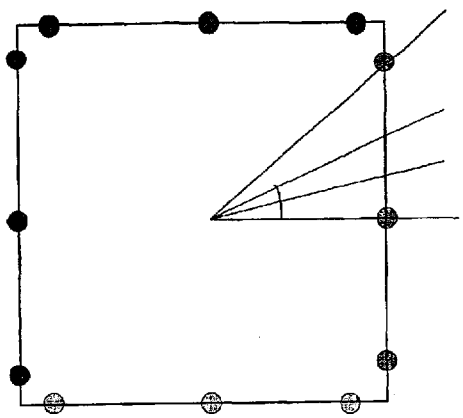
FIG. 3 shows a 2-dimensional arrangement of omni-directional antennas arranged in a square.

Referring now to FIG. 2, there is shown a periodic circular array of omni-directional antennas, as described in Applicant's concurrently filed co-pending application Ser. No. 10/152,799; a beamforming means is operable to generate, in the radial direction of each element in the elevation plane, a group of optimised patterns with low sidelobes in the angular directions between any two adjacent elements, to cover an angular range. In order to cover a range of 360°, only a small weight set operable to cover an angular period is required: each angular period of arc between adjacent antennas is a repetition in terms of the weight applied to other arcs about a central axis of the antenna arrangement. For example a weight set comprising a weight for a beam to be formed in a radial direction from one antenna element together with weights for a number of angles between that antenna element and one of its adjacent antenna elements can be stored to cover one twelfth of the area about the base station: rotation of the weight set twelve times over 360° provides coverage for the whole space surrounding the antenna arrangement. Such an optimum group of beamforming weight sets can be stored in a buffer or other ROM device. The optimum weight set can be used in any other direction by interpolation and rotation of the weight assignment. FIG. 3 shows an antenna arrangement with the antenna elements, being omni-directional in the horizontal plane, arranged in a square. There are four 90° angular periods of rotational symmetry: rotation of the weight set four times over 360° provides coverage for the whole space surrounding the antenna arrangement.

The direction of the downlink beam needs to be determined. This information can be obtained in a number of ways: for example feedback signal may disclose the position by virtue of the Global Positioning System (GPS), by triangulation through the network or the base station itself, as is known. When the downlink beamforming is needed and the direction of the beam is given, a weight set is assigned based on the stored optimum weight set group, and a beampattern with guaranteed low sidelobe level is produced.

Figure 4:
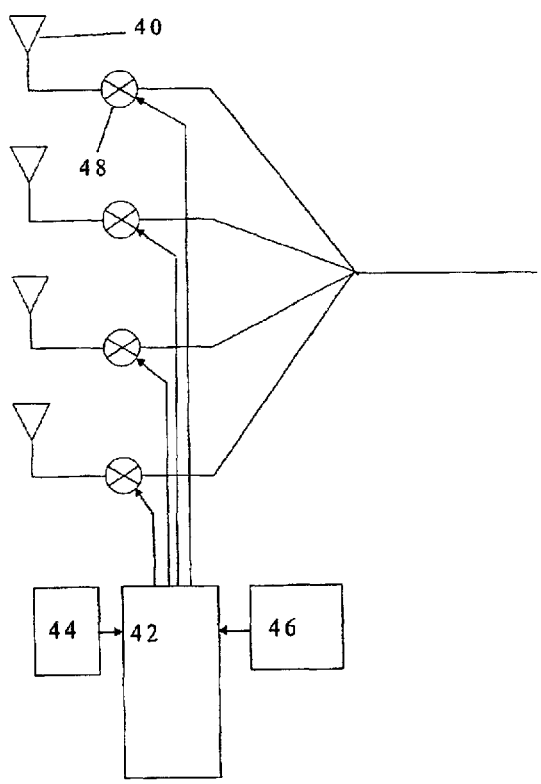
FIG. 4 shows a basic adaptive beamformer configuration.

FIG. 4 shows a schematic configuration of the downlink beamformer; only four antenna elements 40 are shown here, but the beamformer 42 takes into account the direction of arrival of signals 44 which are obtained from a mobile with which it is desired to communicate; weight information is obtained from a ROM 46 or similar. The signals from the beamformer are applied to the antenna input feed by way of multipliers 48. When communication is desired, stored weights corresponding to the directions are obtained; rotation or rotation and interpolation data is factored in and the signals to the antennas are appropriately weighted.

Figure 5:
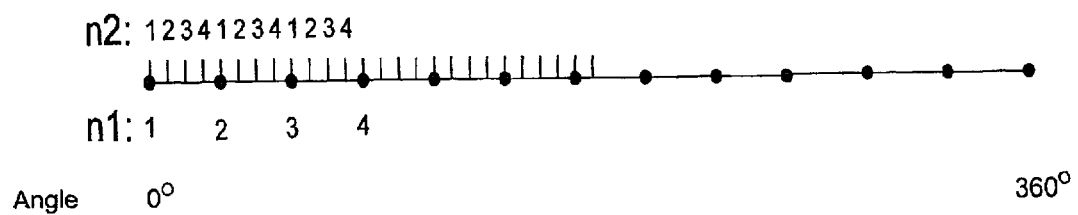
FIG. 5 shows a main beam array pattern interpolation/rotation scale.

FIG. 5 shows how a 360° angular range, being part of an omni-directional beam is divided into 12 'n1' main beams: for example corresponding to the twelve antenna directions of the circular arrangement of FIG. 2. In a simple case, it may be that the rotation of the main beam into any one of twelve antenna directions may be sufficient, then reference need not be made to the n2 weights to provide intermediate beams. Nevertheless n2 intermediate beams would need to be relied upon if the 3 dB beamwidth was less than 30°, for a twelve beam arrangement. The example of FIG. 5 shows four intermediate beams.

Figure 6:
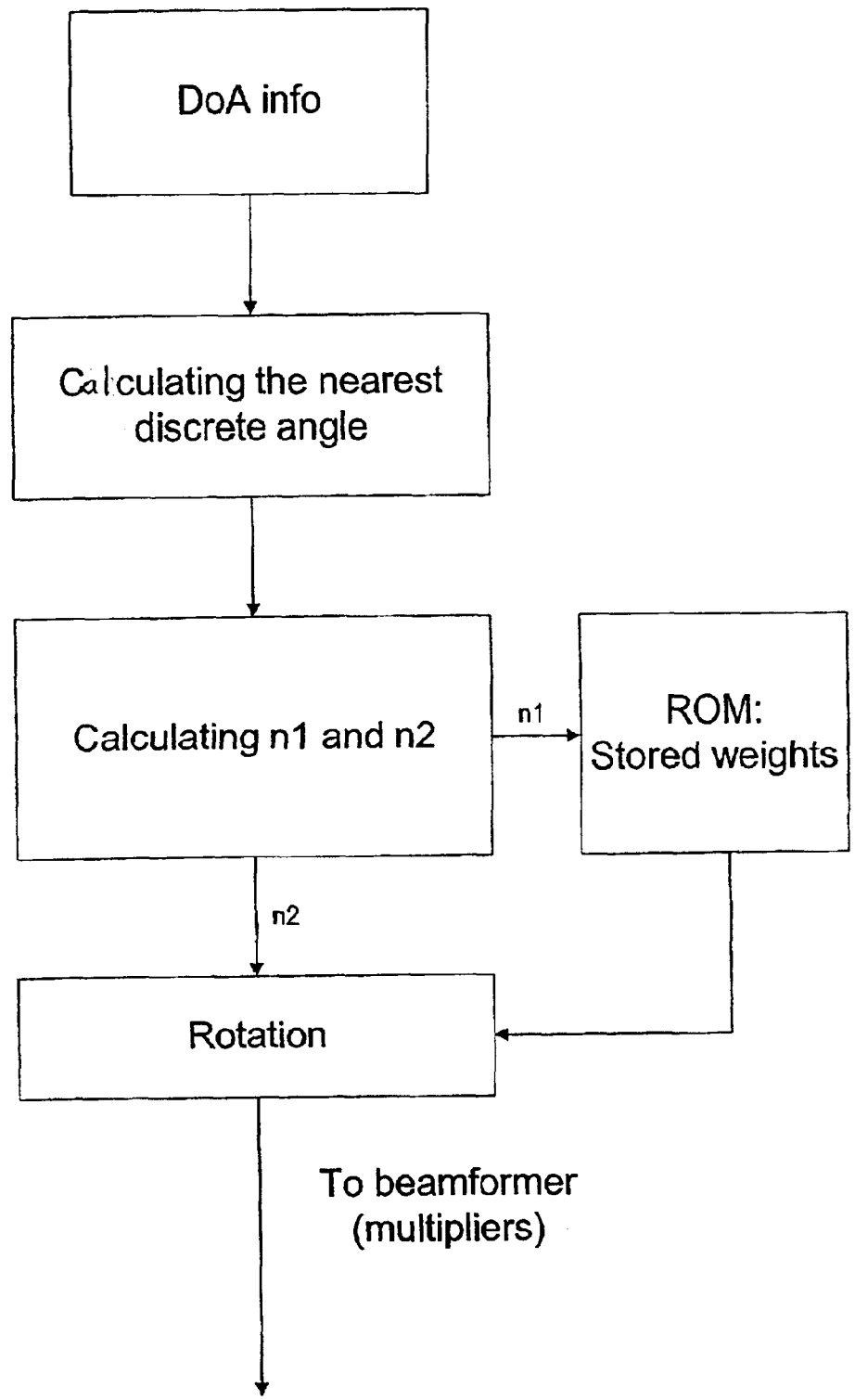
FIG. 6 shows a flow chart relating to beamforming.

FIG. 6 shows a first flowchart: also with reference to FIG. 4, where direction of arrival (DoA) of feed back data from a mobile of a mobile user with whom communication is desired is received by processor 44: the nearest discrete angles relative to a reference are determined. Beamformer 42 refers to stored weight data in ROM 46. In this figure the direction of arrival information corresponds with a main beam direction, the 3 dB beamwidth being such that only rotation of the main beam is required to enable all areas of the cell to be covered. Note, however, that it is possible to determine main beam directions which are independent of any periodicity of the two dimensional array. It will be appreciated that, if the beamwidth is sufficiently broad or there are sufficient stored weights, it is advantageous not to have interpolation between main beam directions since non-regular interpolation can make calculations more difficult or require more processing power/more memory.

Figure 7:
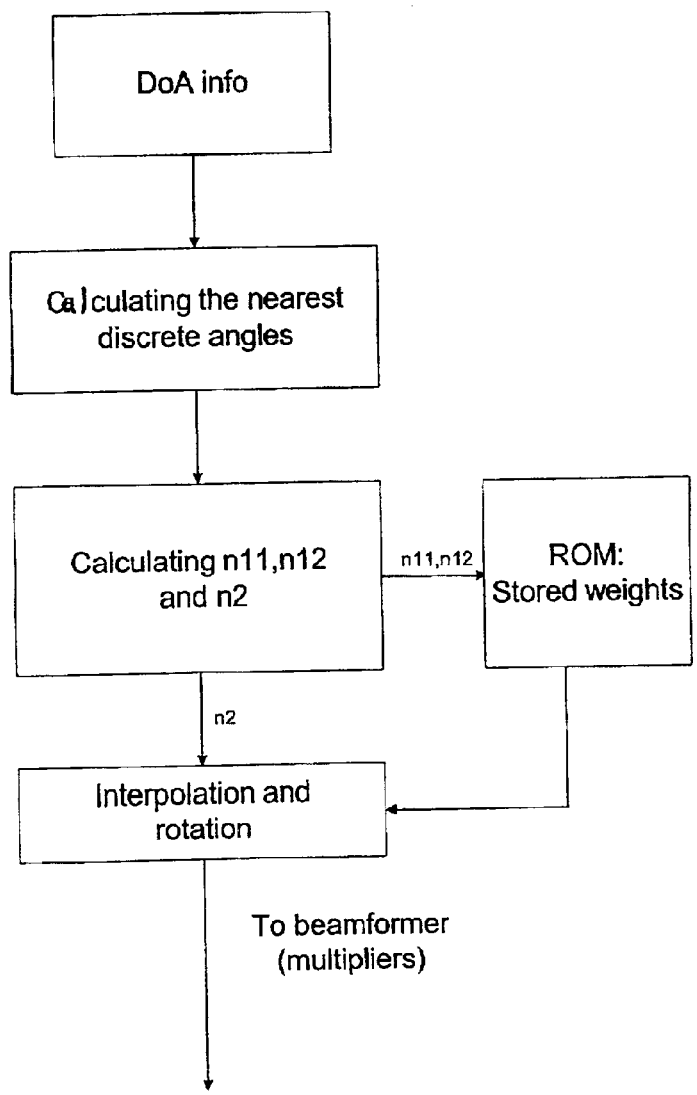
FIG. 7 shows a second flow chart relating beamforming.
Figure 8:
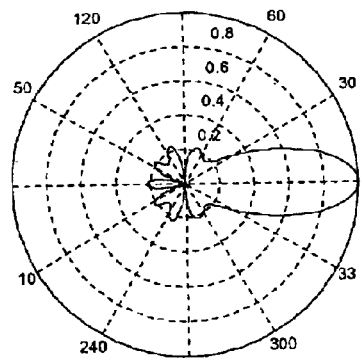
FIGS. 8a and b show some low sidelobe patterns in the horizontal plane from an omni-directional antenna array, at a frequency of 2 GHz.
Figure 8:
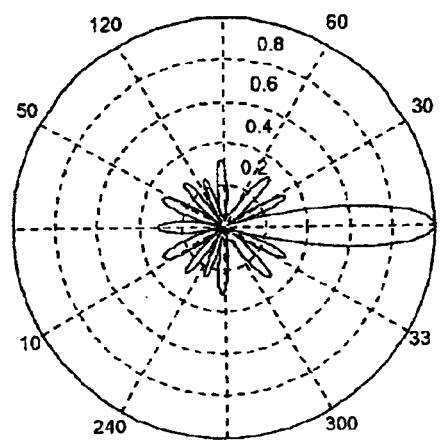

FIG. 7 shows a second flow chart. As in the case of FIG. 6 DoA information is processed to determine the nearest discrete angle relative to a reference (step 2). An interpolation weight set index must be relied upon to determine, together with the rotation weights, an interpolated and rotated main beam (steps 3–5). As with FIG. 6, the signals drive beamformer multipliers 42. FIGS. 8a & b show two optimised low-sidelobe beampatterns. It will be appreciated that the sidelobes are low, being less than −12 dB.

In the R'99 UTRAN specification, a feedback mechanism was introduced to assist the transmit diversity technique employing two antennas. The concept is to transmit downlink signals of constant power from two different antennas using different scrambling codes to all the mobiles in the common channels and then to adapt the antenna weights for dedicated channels according to the feedback received from the intended mobile. Currently, there is great commercial interest in proposals to introduce feedback signalling to four antennas. Such feedback information enables adaptive beamforming for arrays with four elements. On the one hand, owing to the limited bandwidth for signalling, it is unlikely that any signalling mechanism for more than four antennas will be ever introduced. On the other hand, circular arrays for cellular networks need at least eight antennas to achieve significant array gain. Also, it is conceivable that linear antenna arrays consisting of more than four elements will be used in future UTRAN products. Therefore, new beamforming techniques which enable the exploitation of the current feedback signalling scheme, which are limited to two and four antennas, for large arrays are needed.

Figure 9:
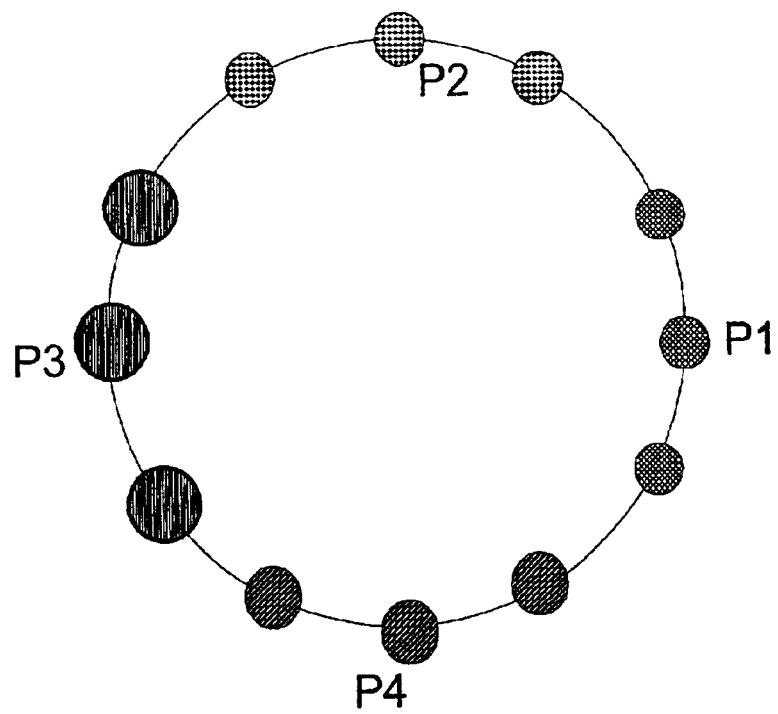
FIG. 9 illustrates sub-arrays of a circular array.

Referring now to FIG. 9, there is shown further embodiment of the present invention. A large antenna array is divided into a small number of groups called sub-arrays, in this case four groups, comprising, for example, two to ten elements, in this case three antenna elements each. Because antenna elements in each sub-array are closely spaced, an antenna element from each array can be chosen as a pilot antenna to transmit different signals as with the transmit diversity scheme. The feedback signal from the intended mobile is then used to place the constraint on the weights of each sub-array for the transmission of dedicated signals.

The magnitude information can be used to set the range for the magnitudes of sub-array weights and then to optimise all the antenna weights subject to such constraints. Alternatively, such magnitude information could be used to fix the magnitudes of each sub-array weights and the phases of all the antenna weights are subsequently determined to optimise the beams. As discussed above, a direction finding function is required to perform such optimisation.

Figure 10:
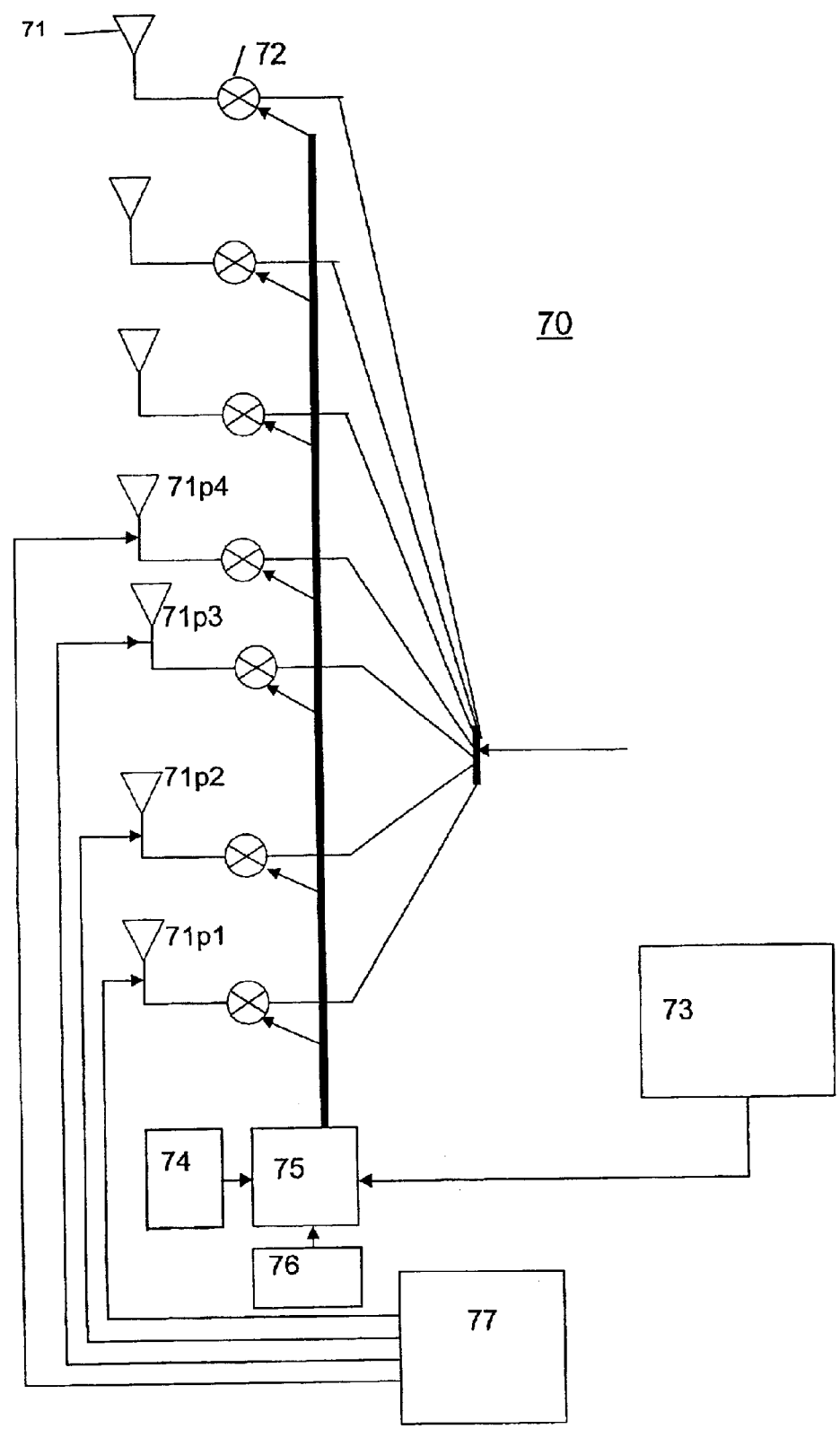
FIG. 10 illustrates a beamformer made in accordance with a first aspect of the present invention.

The optimum beam can either be generated in real time, provided that adequate signal processing power is available, or chosen from a pre-stored optimum set as described above. FIG. 10 shows the configuration of such a downlink beamformer, 70, where four pilot antennas, 71 p1 . . . 71 p4 are used. The signalling for the downlink beams is controlled by unit 77: feedback from the mobiles is interpreted in unit 73 and data is used from unit 73 together with data from stored weight memory 76 and direction of arrival data from unit 74 in a weight assignment unit 75. Signals from the weight assignment unit are fed to the multiplier units in the input transmission line to the antennas. The beamformer corresponds to one suitable for the arrangement of antennas shown in FIG. 9, but only seven antennas are shown in the figure with the pilot antennas 71 p1–71 p4 of FIG. 10 corresponding to pilot antennas 1, 2, 3 and 4 of FIG. 2, the total number of antennas will vary, depending upon the type of antenna employed, be it a circular array, for example, where the number is likely to be eight, twelve or sixteen in practice.

Figure 11:
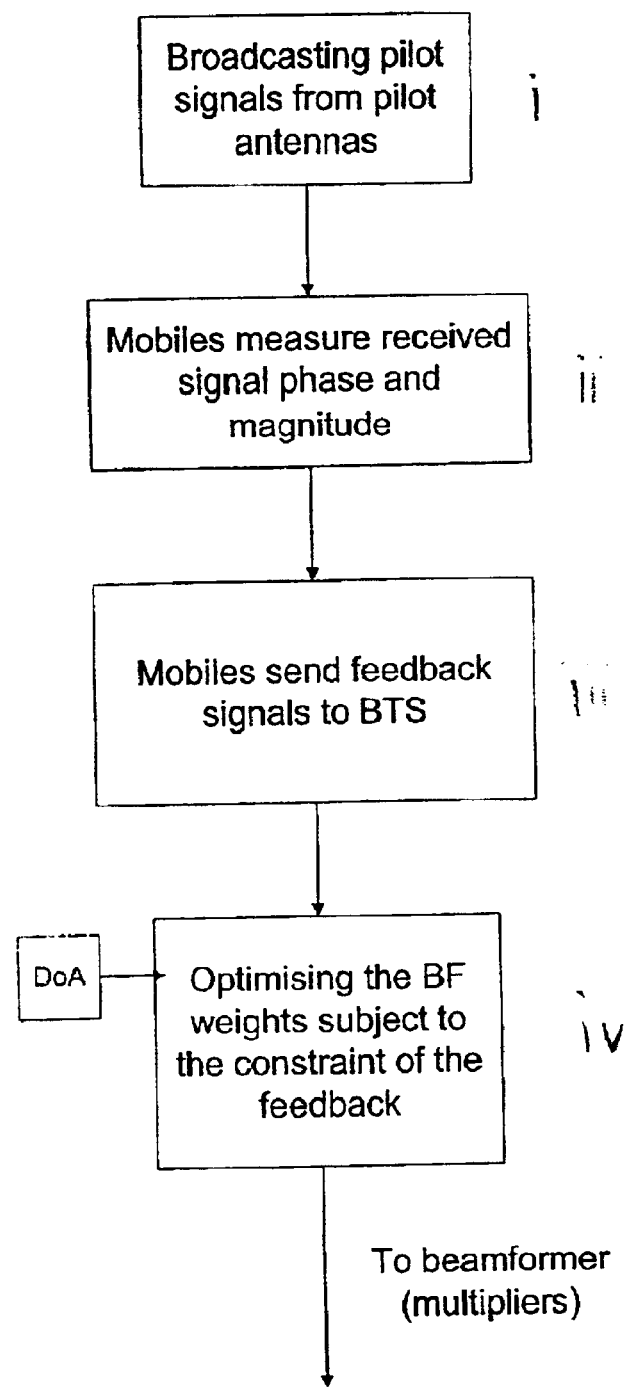
FIGS. 11–13 are flow charts relating to the operation of a beamformer in accordance with the invention.

Referring now to FIG. 11, there is shown a flowchart which depicts the operation of the invention. Essentially, the antenna array is grouped into a number of sub-arrays, for example each sub-array associated with a 90° period about an omni-directional cell-site, with one or more pilot antennas from each sub-group being operable to broadcast pilot signals. The use of only one or only a small number of the antenna elements of a sub-array reduces the bandwidth required for signalling. Feedback received from a mobile in the area of coverage is used as constrain conditions for the optimisation of beamforming weights; no assumption on the antenna elements or array arrangement is made.

A detailed description will now follow: Each pilot antenna from each group of sub-arrays broadcasts pilot signals (step i). Mobile telephones active within the area of coverage measure the pilot signals in terms of signal phase and magnitude (step ii), which information is returned to the base transceiver station (BTS) (step iii). The beam forming weights are then optimised taking into account the constraint of the feedback and direction of arrival information (step iv), which weights are passed to the beamforming means, which can conveniently take the form of multipliers.

Figure 12:
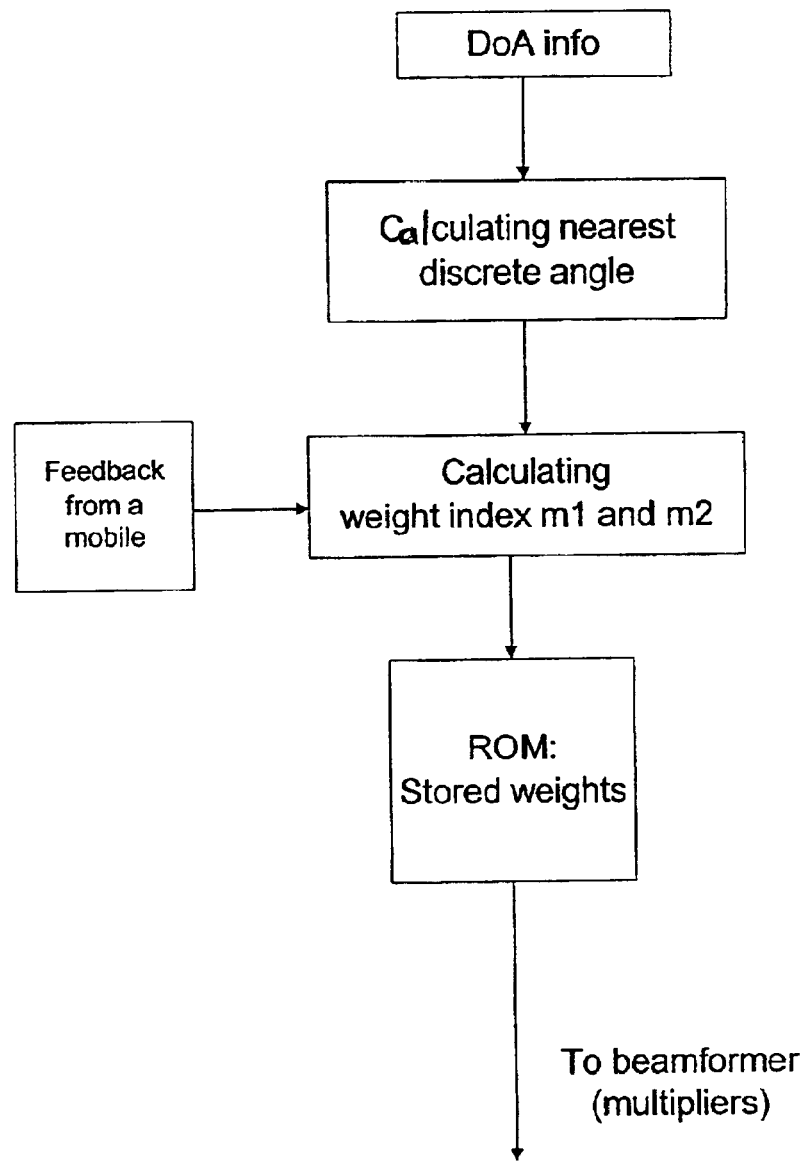

FIG. 12 shows a preferred means of implementing the general concept shown in FIG. 11. For each discrete angle, which is represented by index m1, there is a number of pre-optimised weights corresponding to different feedback combinations which is denoted by index $m_2$. The number of pre-optimised weights could conveniently correspond with the main beams described above, with further pre-optimised weights for the interpolation beam directions, as appropriate.

Figure 13:
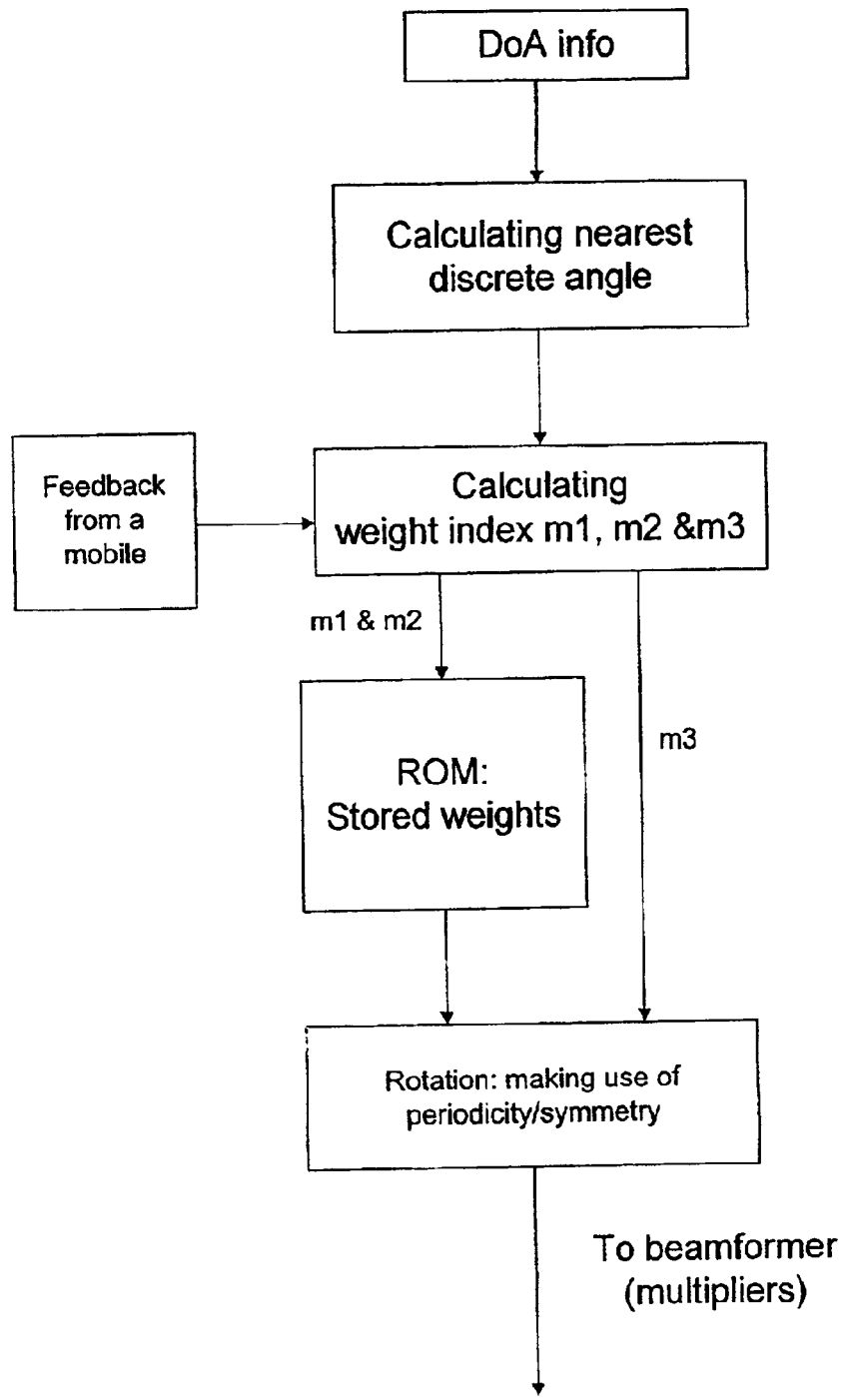

In FIG. 13, a third index $m_3$ is introduced to reflect the fact that there may be a certain symmetry/periodicity associated with the arrangement which can usefully be exploited, so that the number of stored weights can be reduced and, subsequently, an operation of rotation or reflection can be implemented.

What is claimed is:

1. A smart antenna basestation arrangement comprising an array of antenna elements, subdivided into a number of sub-arrays wherein:
   an element or selected elements from each sub-array is operable to transmit pilot signals which are, in operation, returned by mobile terminals that are active within an area of coverage of the basestation;
   said mobile terminals measure signal phase and magnitude of the pilot signals, and return information regarding signal phase and magnitude to the base station; and
   the arrangement operable to apply stored weight data and direction of arrival data together with the returned information, to enable the array to generate directional downlink beams in the direction of said mobile terminals.

2. The arrangement according to claim 1 wherein the returned information assists in the optimization of phase and amplitude components for beamforming weights to be assigned for dedicated channels.

3. The arrangement according to claim 1 wherein the returned information assists in the optimization of a phase component for beamforming weights to be assigned for dedicated channels.

4. The arrangement according to claim 3 wherein returned phase information is used to determine a phase component of pilot antenna weights.

5. The arrangement according to claim 1 wherein the returned information assists in the optimization of an amplitude component for beamforming weights to be assigned for dedicated channels.

6. The arrangement according to claim 1 wherein the magnitude of the returned information is used to determine a magnitude component of pilot antenna weights.

7. The arrangement according to claim 1 wherein the array has a physical periodicity, to reduce the number of principal optimum weight sets.

8. The arrangement according to anyone of claims 1, wherein the array comprises a circular array with a regular space between adjacent.

9. The arrangement according to anyone of claims 1, wherein the array comprises a square array.

10. The arrangement according to anyone of claims 1, wherein the antennas comprise directional antennas.

11. The arrangement according to anyone of claims 1, wherein the antennas comprise omni-directional antennas.

12. The arrangement according to claims 1 wherein a number of angular directions are selected within an angle formed by two adjacent elements, to obtain a basic optimum weight set group.

13. A method of operating a smart antenna basestation arrangement comprising an array of antenna elements, subdivided into a number of sub-arrays, the method comprising the steps of:

transmitting pilot signals from an element or selected elements of each sub-array;

mobile terminals that are active within an area of coverage of the basestation measuring signal phase and magnitude of the pilot signals;

said mobile terminals returning information regarding said signal phase and magnitude to the basestation;

receiving the information returned by said mobile terminals; and applying stored weight data and direction of arrival data together with the returned information to enable the array to generate directional downlink beams in the direction of said mobile terminals.

14. A method according to claim 13 wherein the returned information assists in the optimization of phase and amplitude components for beamforming weights to be assigned for dedicated channels.

15. The method according to claim 13 wherein the returned information assists in the optimization of a phase component or beamforming weights to be assigned for dedicated channels.

16. The arrangement according to claim 13 wherein the returned information assists in the optimization of a amplitude component for beamforming weights to be assigned for dedicated channels.

* * * * *